(12) United States Patent
Clarke

(10) Patent No.: US 8,337,128 B2
(45) Date of Patent: Dec. 25, 2012

(54) MONITORING FASTENING LOADING

(76) Inventor: Ronald C. Clarke, Phoenix, AZ (US)

( * ) Notice: Subject to any disclaimer, the term of this patent is extended or adjusted under 35 U.S.C. 154(b) by 317 days.

(21) Appl. No.: 12/774,557

(22) Filed: May 5, 2010

(65) Prior Publication Data

US 2010/0284759 A1 Nov. 11, 2010

Related U.S. Application Data

(60) Provisional application No. 61/175,683, filed on May 5, 2009.

(51) Int. Cl.
*F16B 31/02* (2006.01)
(52) U.S. Cl. .............................. 411/14; 411/432; 73/761
(58) Field of Classification Search .................... 411/13, 411/14, 432; 73/761
See application file for complete search history.

(56) References Cited

U.S. PATENT DOCUMENTS

| | | | | |
|---|---|---|---|---|
| 4,709,654 A | * | 12/1987 | Smith | 116/283 |
| 5,668,323 A | * | 9/1997 | Waxman | 73/761 |
| 5,885,040 A | * | 3/1999 | Parker | 410/50 |
| 7,520,174 B2 | * | 4/2009 | Clarke | 73/761 |
| 8,024,979 B2 | * | 9/2011 | Clarke | 73/761 |

* cited by examiner

*Primary Examiner* — Flemming Saether
(74) *Attorney, Agent, or Firm* — Craig Steven Jepson; Reed & Scardino LLP

(57) ABSTRACT

A retrofit system for providing a load indicator on a foundation bolt. The system includes a fastener having a fastener head, gauge length and central fastener bore in the gauge length and head. A datum rod is anchored in the central bore with a free datum rod being moveable longitudinally relative to the fastener head during elongation of the fastener gauge length. An internally threaded fastener portion below the central fastener bore is configured to thread over a foundation bolt. A compression sleeve positioned over the foundation bolt is configured to receive the load indicating fastener therein and to bear the compressive forces of the fastening. Elongation of the gauge length as the fastener is tightened onto the stud is manifest as displacement of the datum rod end, which displacement is measured to provide an indication of fastener loading.

15 Claims, 11 Drawing Sheets

MONITORING FASTENING LOADING

CROSS-REFERENCE TO RELATED APPLICATION(S)

The present application claims the benefit of U.S. Provisional Application No. 61/175,683, filed May 5, 2009, which is incorporated herein in its entirety by reference.

BACKGROUND

1. Field of the Invention

This invention relates to monitoring loads in fastenings, and more particularly to in-fastening load monitors.

2. Description of the Related Art

Fasteners are used in a wide variety of industrial installations where achieving proper fastener loading (tension) and maintaining this loading in service can be problematic. Monitoring the load on a fastener during installation and service can be equally problematic.

Many industrial fastening applications require a predetermined loading at installation and periodic monitoring of loading to ensure that loading remains within an acceptable range. Checking the loading with a torque wrench typically requires loosening and then retorquing of the fastening. This is particularly onerous in high corrosion and high cycle loading applications.

Overtightening a fastener can lead to catastrophic failures. Conversely, fasteners typically experience some loss of tension in service due to, for example, a variety of in-service occurrences including: relaxation (thread embedment), vibration loosening, compressive deformation in the joint or flange, temperature expansion or contraction, etc. Loss of tension from these occurrences can cause misalignment or premature wear in a bolted assembly, leakage (in applications where the fastener is used for sealing), or catastrophic joint failure due to excessively high loads on other members of the assembly.

In certain applications, knowledge of a fastener load, upon installation and over time, is desirable for avoiding the potentially dangerous consequences of a compromised or loosened fastener, such as slippage, wear, leakage and/or possible failure. In other applications, for example when working with a group of bolts around a flange of a sealed assembly, it is important to evenly tighten the group of bolts. By uniformly tightening a group of bolts or studs to an appropriate load, and maintaining this load over time, potential failures are less likely to be experienced.

Accordingly, improvements are sought in determining and monitoring fastener loading.

SUMMARY

It has been discovered that existing foundation bolt installations may be retrofit with a load indicator for in-use load monitoring. A hardened gauge nut is used to cut the foundation bolt to a predetermined length. The gauge nut is then removed and a load indicating assembly is installed on the foundation bolt. A centering plate and compression sleeve are placed over the foundation bolt. The centering plate has an annular rim for centering the compression sleeve. A fastener having a fastener head, gauge length, central bore and internally threaded portion is threaded onto the foundation bolt within the sleeve. A split washer can be assembled around the gauge length portion of the fastener between the fastener head and compression sleeve. The split washer can include a collar which is received within the sleeve and is partially retained in the sleeve.

One aspect of the invention features a load indicating fastening system for use in a fastening. The system includes a fastener having a fastener head and a fastener gauge length below the head. The head and gauge length together define a central fastener bore. A datum rod has a longitudinal length with a first end anchored at a first portion of the central bore and a substantially free datum end closer to the fastener head and moveable longitudinally relative to the fastener head during elongation of the fastener gauge length. An internally threaded fastener portion below the central fastener bore is configured to thread over external threads of a complementary stud, such as foundation bolt. A compression sleeve is sized to receive the internally threaded fastener portion and the fastener gauge length and to bear the compression forces of the fastening between the fastened head and the fastening joint surface. A base washer can be used between the compression sleeve and the joint surface. The base washer can include a rim or other feature for centering or otherwise positioning or retaining the compression sleeve.

In some cases, the stud is a foundation bolt. In some cases, the stud is the threaded portion of a bolt. In some cases, the stud is a thread rod such as thread stock.

In some implementations, the compression sleeve is constructed with sufficient column strength to be substantially incompressible under normal fastening loading, e.g., below the yield load of the foundation bolt.

In some implementations, the system further includes a split washer between the fastener head and the top of the compression sleeve. In some cases, a portion of the split washer is positioned radially between the gauge length and the compression sleeve. For example, in some cases, the split washer includes a shoulder or collar configured to fit within the compression sleeve to substantially align the split washer and gauge length within the compression sleeve. The collar on the split washer is received in the compression sleeve interior to retain the split washer.

In some cases, the compression sleeve is substantially cylindrical. Preferably, the compression sleeve is constructed to substantially resist deformation during elongation of the fastener gauge length. This ensures that the measured load accurately reflects gauge length elongation.

In some implementations, the system further includes a lever pivotally fixed within the central bore of the gauge length and responsive to displacement of the datum rod within the central bore. The lever provides an amplified response to the displacement. In some cases, the system further includes a second lever pivotally fixed within the central bore and responsive to the first lever. In some cases, the fastener gauge length is of a lesser outer diameter than the outer diameter of the internally threaded fastener portion.

In some implementations, the system further includes a base washer with a semi-spherical projection and a complementary seat on the compression sleeve to allow for variable alignment of the compression sleeve on the spherical projection of the washer. In some cases, the compression sleeve defines a hemi-spherical seat to receive hemi-spherical projection of the centering base over a range of angles. The range of movement between the projection and seat accommodates a wide range of differences between the anchor bolt and flange angle. In some cases, an internal diameter of the compression sleeve serves as a seat for the hemi-spherical projection of the centering base washer. In some implementations, the base washer includes a shoulder configured to align the compression sleeve with the washer.

In some implementations, the fastener head defines a datum reference surface configured such that displacement of the datum end is measurable relative to the datum reference surface to determine loading.

In some implementations, the system further includes a datum rod end displacement reader. The reader measures and amplifies a change in the gauge length base on datum rod displacement. The reader or "indicator" can be fixed within or removably coupled to the fastener. In some cases, the indicator is disposed within the bore above the datum rod. In other cases, the indicator is positioned atop the fastener head above the datum rod. Thus, integral or removable readers may be used in various implementations.

Another aspect of the invention features a method of measuring a load applied to a fastening. The method includes sizing the length of one of a compression sleeve and an externally threaded stud to provide a predetermined length of compression sleeve beyond an end of the stud in a fastening to be formed. The method further includes positioning a compression sleeve over an externally threaded stud and positioning a portion of a fastener within the compression sleeve. The fastener includes a fastener head and a fastener gauge length below the head. The head and gauge length together define a central fastener bore. A datum rod has a longitudinal length with a first end anchored at a first portion of the central bore and a substantially free datum end closer to the fastener head and moveable longitudinally relative to the fastener head during elongation of the fastener gauge length. An internally threaded fastener portion below the central fastener bore is configured to thread over external threads of a complementary stud. A compression sleeve is sized to receive the internally threaded fastener portion and the fastener gauge length. The method further includes threading the internally threaded fastener portion onto the externally threaded stud, tightening the fastener onto the stud to apply a compressive force to the compression sleeve, and measuring displacement of the datum rod to determine fastener elongation and thereby the loading in the fastening.

In some applications, the method further includes positioning a washer or spacer between the fastener head and the compression sleeve. In some cases, the washer is a split washer. The split washer centers the fastener within the compression sleeve and provides a bearing surface for the fastener head.

In some applications, measuring displacement of the gauge length is performed by non-contact methods, e.g., by measuring a property of a gap formed between the datum rod end and a reference surface on the fastener head. For example, properties can be measured by sonic, resistive, optical or other techniques know in the art.

In some applications, the load indicating system can be installed on a selected number of fasteners in a machinery foundation, such as a wind turbine foundation or industrial compressor foundation. An electronic reader, such as the SPC4™ reader available from Valley Forge and Bolt Manufacturing Co., can be used to remotely monitor elongation and thereby the loading of the selected fastenings. Alternatively, fixed or removable mechanical or in-bore readers, such as those used in the Maxbolt™ bolts or dual lever readers available from Valley Forge and Bolt Manufacturing Co. can be used, for in-person monitoring. Thus, the system can provide statistical assurance that the foundation fastenings are sufficiently tight. This is particularly important, in installation experiencing high frequency reciprocating forces such as those present in wind turbines, mills, and other industrial installations.

In some applications, the system may be an original installation. In some applications, the system is installed as a retrofit to existing foundation installations. The internally threaded portion is threaded on to the existing stud within the compression sleeve after cutting the stud to a predetermined length. A hardened gauge nut or other suitable gauge can be used to aid in trimming the nut and to clean the threads upon removal.

The fastener is then tightened, compressing the sleeve between the head of the fastener and the foundation adjacent the foundation stud. The instantaneous loading can readily determined at a glance using a visual scale on an elongation reader. The reader can be temporarily mounted on the fastener or can be fixed within the central bore of the fastener.

The fastener and sleeve can be sized for any number of applications. In some applications, it is advantageous for the sleeve and fastener to be as short as possible. Accordingly, the stud is trimmed to a predetermined length and the sleeve and fastener are sized to provide measurable elongation of the gauge length as determined by measuring displacement of the datum rod within the central bore. The fastener gauge length can be necked down to obtain a shortened gauge length for shortened assemblies.

Thus, the fastener loads can be measured to determine whether loadings are within an acceptable window or range, e.g., 40-60 percent window of acceptability, of operational loading. For example, a reading more than plus or minus 10 percent outside a predetermined operating range can be signal a need for retightening or replacing a fastener.

In some implementations, a mechanical reader or "indicator" contacts the datum rod. In some cases a first and/or second lever are pivotally connected within a reader housing and responsive to datum rod displacement. The levers cooperate such that a load display pointer or other indicator is responsive to movement of the first and/or second levers.

In some implementations, the load indicator provides an electrical signal, an audible signal or a visual signal.

In some external indicator implementations, coupler interfaces on the fastener and the indicator couple the indicator to the fastener via at least one of a snap fit, interference fit, threaded fit, and magnetic attraction. In some cases, the interfaces are configured to align the datum probe with the free end of the datum rod.

An example indicator includes a housing defining a fastener interface configured to removably couple the housing to a fastener. A moveable datum probe extends from the housing. The fastener interface is configured to align the datum probe with a datum rod of a fastener. A first lever is pivotally mounted within the housing and is moveable in response to displacement of the datum probe. A load display is configured to indicate a degree of loading of a fastener as a function of displacement of the datum probe. In some cases, the load display includes a visual scale and a pointer associated with the first lever.

In some implementations, a second lever is associated with the first lever to produce a second amplified response to movement of the datum probe.

In some implementations, the fastener head defines a reference surface and a load indicator indexing interface. A free end of the datum rod moves relative to a reference surface on the fastener head upon loading and elongation of the fastener. In some cases, a portion of the reference surface also serves as the load indicator indexing surface. The load indicator indexing interface on the fastener head and the bolt indexing interface on the load indicator provides for alignment and/or temporary mounting of the load indicator atop the fastener.

As the load indicator is pressed onto the bolt head, the datum probe of the load indicator is progressively pushed into the load indicator housing until the bolt indexing interface engages the load indicator indexing interface. Displacement of the free end of the datum rod relative to the reference surface is translated into a measurement of fastener loading via the corresponding movement of the datum probe, levers and pointer. Thus, the pointer moves along the visual scale of the load indicator in proportion to the displacement of the datum probe, e.g., by measuring a corresponding gap produced between the reference surface and datum rod as a result of fastener loading. In some cases, the gap between the datum rod and reference surface can be additionally or alternatively measured using sonic, optical, or resistance measurements or other non-contact gap measuring techniques.

In some implementations, a load indicator includes first and second cooperating levers, each having first and second ends. The first free end of the first lever serves as the datum probe and the second free end of the second lever serves as the pointer. The levers are pivotally retained on pivot pins within the load indicator housing. A spring or other biasing device serves to bias one or more of the levers in a particular direction. For example, in some cases, a spring biases the cooperating levers such that the pointer rests adjacent the 100% portion of the visual scale. As the load indicator is mounted on the fastener, the datum probe contacts the datum rod and moves the pointer down the visual scale to the appropriate percentile load indicator. In some cases, the use of multiple levers provides for amplified pointer response while allowing the load indicator housing to be of a compact construction. In some cases, the load indicator can fit entirely within the central bore.

In some implementations, the load indicator is configured to be further connected to a power tightening tool to facilitate automatic shut-off of the tool upon reaching a certain loading, as signaled by the load indicator. For example, the load indicator can provide an electrical signal corresponding to the movement of the datum probe and the tool can be configured to shut-off upon detection of a predetermined electrical signal value. In a particular case, the load indicator is positioned within a driver on the tool such that the load indicator and driver are simultaneously pressed onto the fastener.

In some implementations, the load indicator can be coupled to a fastener to provide ongoing loading measurements. For example, the load indicator can be snap fit or interference fit onto a fastener head for periodic readings or can be threaded onto the fastener head or otherwise fixedly mounted to provide ongoing measurements. Thus, the load indicator can be removably or effectively permanently attached to the fastener to provide a desired frequency of readings. In some cases the indicator includes a sensor for sensing said displacement of the datum probe and translating the displacement into a readable signal. In some cases, the sensor includes one of a displacement transducer and a pressure transducer.

In some implementations, multiple levers within the load indicator may cooperate to indicate the load on the fastener by amplification of the elongation experienced by the fastener. A multi-lever design may be used to provide a visible range of pointer movement even with a significantly reduced indicator diameter and a reduced indicator depth. Use of two levers in a load indicator reduces the range of movement and the degree of clearance required for the first lever. For in-fastener implementations, this significantly reduces the dimensions of the section of the fastener bore required to accommodate the amplified lever response. Additional advantages afforded by the present invention include increased sensitivity of the load indicator, a reduction in the overall length of load indicator and in the depth of the bore.

In some implementations, a load indicator can be incorporated into the fastener itself. For example, a cartridge carrying the two levers may be press-fitted or threaded into the central bore. Various implementations may include a seal between the cartridge and fastener to protect the load indicator from water, chemicals, dirt, and other environmental conditions.

In some implementations, a load indicator may be removably coupled to a fastener with a displacement gauge precisely indexed relative to the fastener head via a plurality of indexing projections on the load indicator that engage a coupler on the fastener head. The precise positioning or "indexing" of the displacement gauge relative to a reference surface defined on the male coupler of the fastener head allows for precise measurement of fastener elongation based on movement of a datum rod disposed in a bore in the fastener.

A load indicator can be removably coupled to a male coupler on a fastener via a and includes a gauge housing defining a female coupler having an interior dimension sized to receive at least a portion of the male coupler defined on the fastener head. A displacement gauge is disposed within the housing and includes a moveable probe disposed within the female coupler and engageable response to movement of the second free end of the datum rod when the load indicator is coupled to the fastener. A plurality of indexing projections are spaced about an interior of the female coupler and moveable to engage the male coupler of the fastener head to thereby index the moveable probe relative to the fastener proximate to the second free end of the datum rod. In some cases, the male coupler includes discreet recess. In some cases, the male coupler includes an annular recess for receiving the projections.

The details of one or more implementations of the invention are set forth in the accompanying drawings and the description below. Other features, objects, and advantages of the invention will be apparent from the description and drawings, and from the claims.

BRIEF DESCRIPTION OF THE DRAWINGS

The present invention may be better understood, and its numerous objects, features, and advantages made apparent to those skilled in the art by referencing the accompanying drawings.

Like reference symbols in the various drawings indicate like elements.

DESCRIPTION OF THE PREFERRED EMBODIMENT(S)

Figure 1:
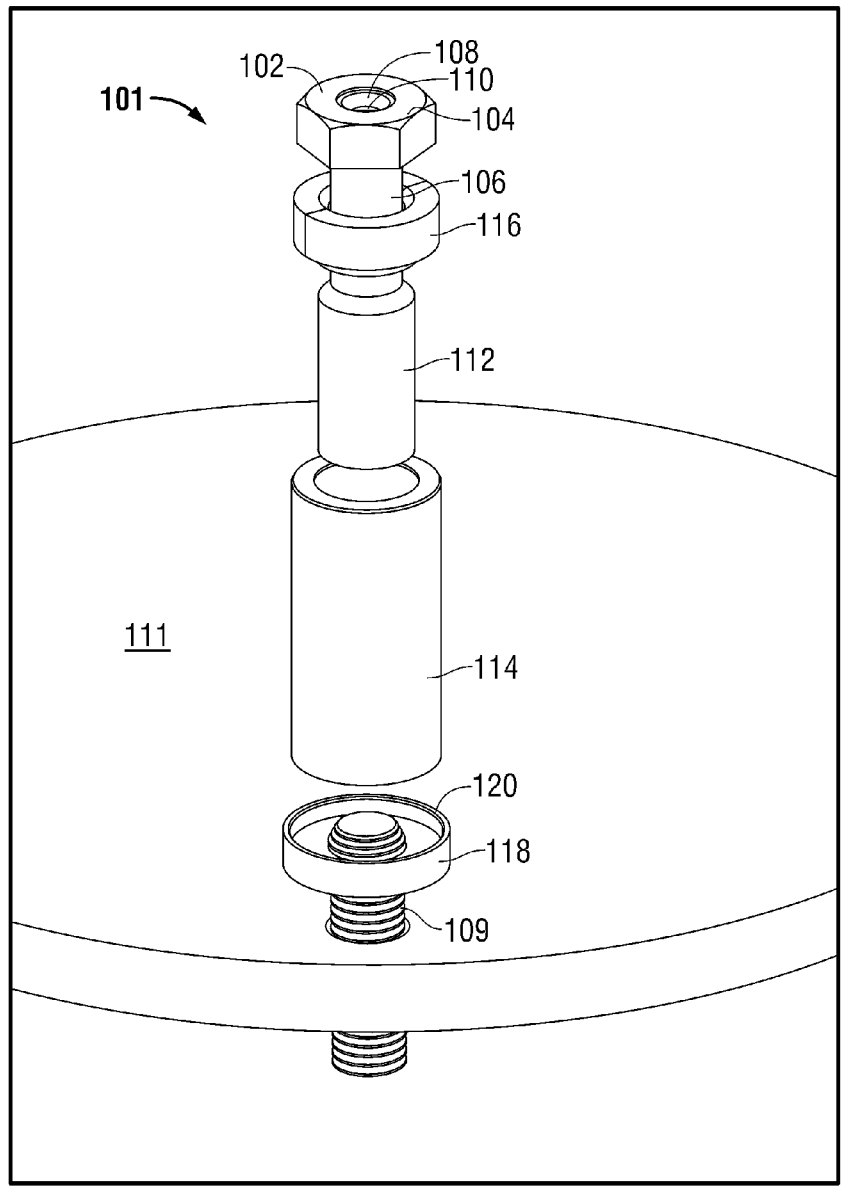
FIG. 1 is an exploded perspective view of a load indicating fastening system.

With reference to FIG. 1, a load indicating fastening system 101 forms part of a fastening. System 101 includes a fastener 102 having a fastener head 104, a fastener gauge length 106 below head 104. Head 104 and gauge length 106 together define a central fastener bore 108.

A datum rod 110 has a longitudinal length with a first end anchored at a first portion of the central bore 108 and a substantially free datum end closer to the fastener head 104 and moveable longitudinally relative to the fastener head 104 during elongation of the fastener gauge length 106.

An internally threaded fastener portion 112 extends below the central fastener bore 108 and gauge length 106. Internally threaded fastener portion 112 is configured to thread over external threads of a complementary stud 109, such as a foundation bolt. A compression sleeve 114 is sized to receive the internally threaded fastener portion 112 and the fastener gauge length 106.

A split washer 116 is provided between fastener 102 and compression sleeve 114. In some cases, split washer 116 is between fastener head 104 and a top surface of compression sleeve 114. In some cases, a portion of the split washer is disposed in an annular space between gauge length 106 and interior surface of compression sleeve 114. For example, split washer 116 can include a collar or shoulder configured to be received within the compression sleeve to aid in aligning or centering fastener 102 within compression 116. Split washer 116 provides a bearing or contact surface under fastener head 104 other than the top surface of compression sleeve 114.

An annular centering base 118 is first placed over stud 109 on a fixed fastening surface 111, such as a foundation plate or pipeline flange. Centering base 118 is configured with a rim 120 sized to receive compression sleeve 114 to center compression sleeve 114 relative to stud 109.

In other implementations, the centering base includes a hemi-spherical central projection for improved centering or alignment of compression sleeve 114 on stud 109 extending from an inclined fastening surface 111. For example, stud 109 may extend at an acute angle to surface 111 in some applications. A lower end of compression sleeve 114 can be positioned over the hemi-spherical projection on centering base 118 and adjusted to substantially align compression sleeve 114 about stud 109 to permit threading of portion 112 onto stud 109. Thus, centering base 118 may be configured to accommodate various angles of stud 109 relative to surface 111. In some cases, centering base 118 may be tapered to compensate for a complementary angle between stud 109 and surface 111.

In some implementations, centering base 118 and compression sleeve 114 can include additional complementary features. For example, anti-shear or counter-force features can be used to prevent rotation of compression sleeve 114. Such features can include a slotted ring to provide a reaction point for a reaction bar.

Figure 2:
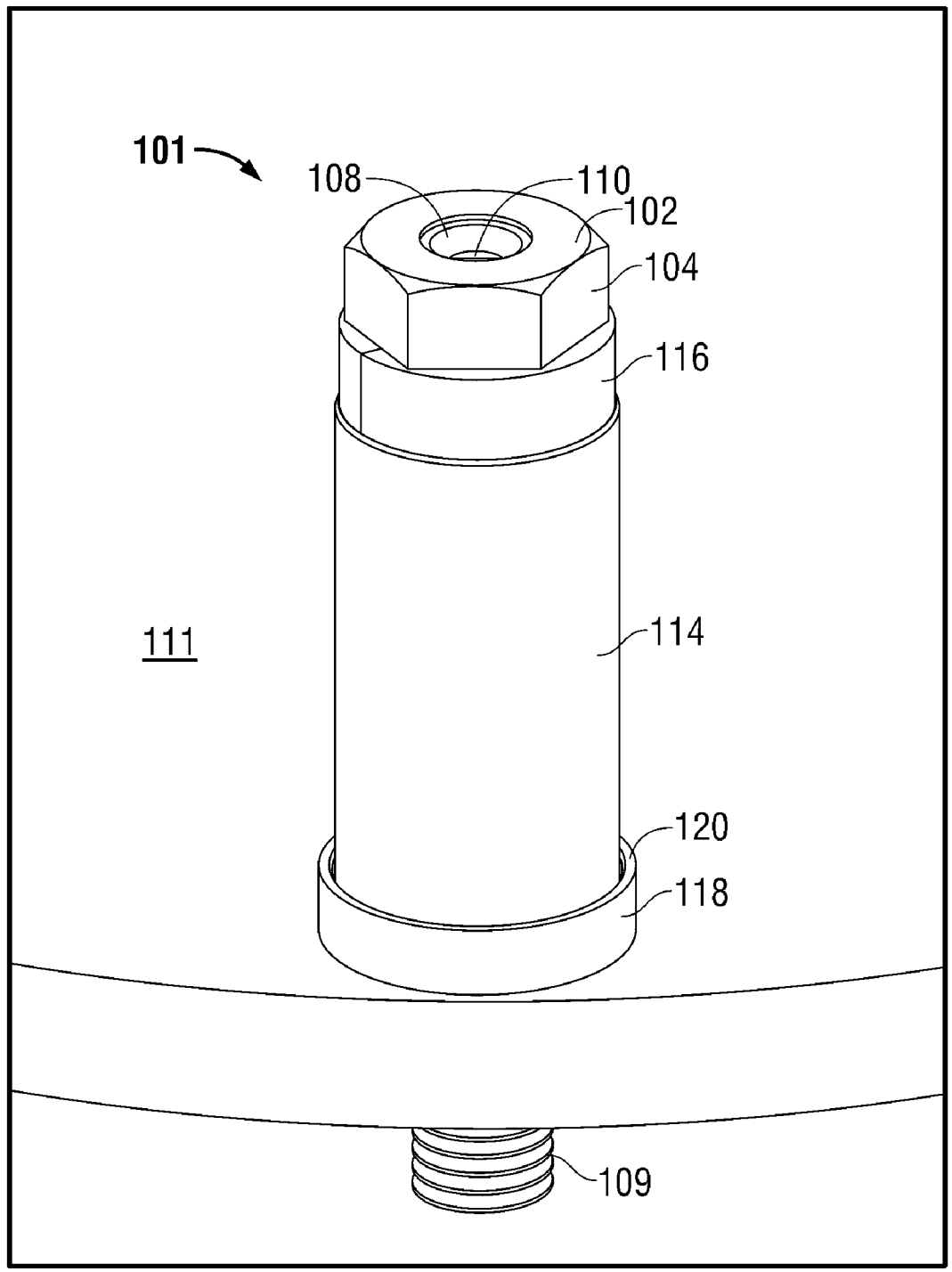
FIG. 2 is a perspective side view of a fastening including the load indicating fastening system of FIG. 1.

With reference to FIG. 2, a fastening is made including the load indicating fastening system 101 of FIG. 1. The system 101 is used to measure a load applied to the fastening.

During installation of system 101, a gauge nut is threaded onto stud 109, which is then cut to a predetermined length with reference to the nut. The nut further serves to clear or reform the threads at the severed end of stud 109. Alternatively, compression sleeve 114 can be sized to cooperate with any given stud length to provided a known combination of stud length and sleeve length. As can be appreciated, the predetermined stud and sleeve lengths provide a known reference for system 101 relative to base surface 108.

Centering base 118 is then placed over stud 109 with rim 120 facing up. Compression sleeve 114 is then positioned within rim 120 over stud 109. In cases in which a hemispherical projection is provided on centering base 118, compression sleeve 114 is adjusted on the projection to substantially align compression sleeve 114 longitudinally with stud 109.

The two halves of split washer 116 are then assembled together around gauge length 106 of fastener 102. Internally threaded portion 112 and gauge length 106 of fastener 102 are then inserted, together with a collar portion of split washer 116 into compression sleeve 114. Fastener head 104 is then driven to threadably engage internally threaded portion 112 and stud 109. Fastener head 104 is further driven to tighten fastener 102 onto stud 109 to apply a compressive force to compression sleeve 114. Upon loading, elongation of gauge length 106 is measured to determine loading of the fastening.

Figure 3:
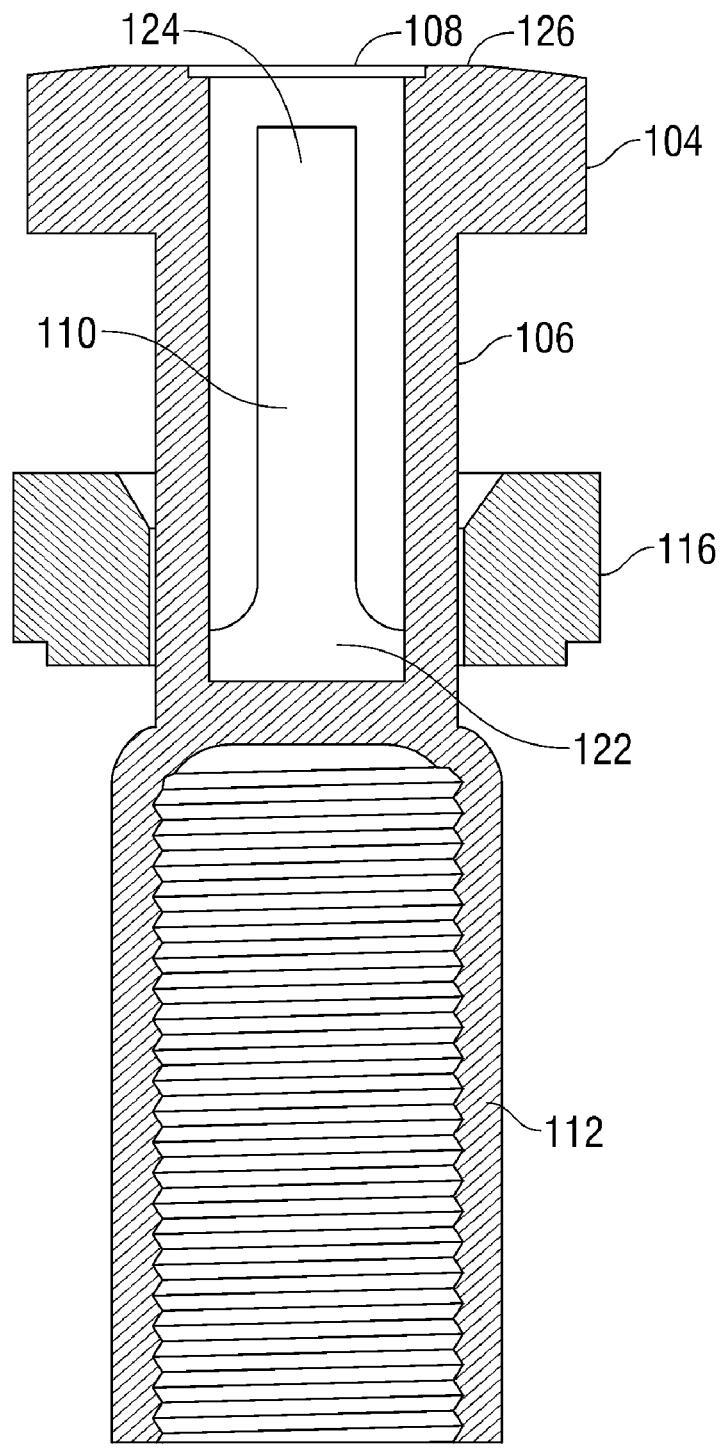
FIG. 3 is a cross-sectional view of the internally threaded fastener and split washer of FIGS. 1-2.

With reference to FIG. 3, a cross-sectional view of fastener 102 illustrates operation of datum rod 110 within central bore 108 of fastener 102. A first end 122 of datum rod 110 is anchored with a lower portion of central bore 108 to provide a fixed reference at one lower portion of gauge length 106. Datum rod 110 extends along central bore 108 to a free datum rod end 124 adjacent fastener head 104.

Fastener head 104 is provided with a reference surface 126 having a known unloaded position relative to free datum rod end 124. For example, datum rod end 124 is depicted here as being a fixed distance from a top surface 126 of fastener head 104. In some cases, datum rod end 124 is substantially coplanar with a reference surface 126, e.g., top surface, of fastener head 104 in an unloaded state.

As fastener head 104 is driven to tighten fastener 102 and compress sleeve 114, gauge length 106 ultimately exhibits a measurable elongation. Gauge length elongation, and thereby loading, is determined by measuring displacement of the datum rod free end 124 relative to reference surface 126 to determine the loading in the fastening.

In some implementations, datum rod free end 124 is positioned below an in-bore integrated datum rod reader as disclosed in U.S. Pat. No. 5,668,323 issued Sep. 16, 1997 to Cory S. Waxman, and U.S. Pat. No. 7,520,174, issued Apr. 21, 2009 to Applicant, which are included herein by reference in their entirety.

Thus, aspects of the invention can be used in different implementations with external and in-bore or in-fastener datum rod displacement indicators. In particular implementations, external or in-bore readers can be used to provide electrical signals to control operation of a tool driving fastener head 104.

Figure 4:
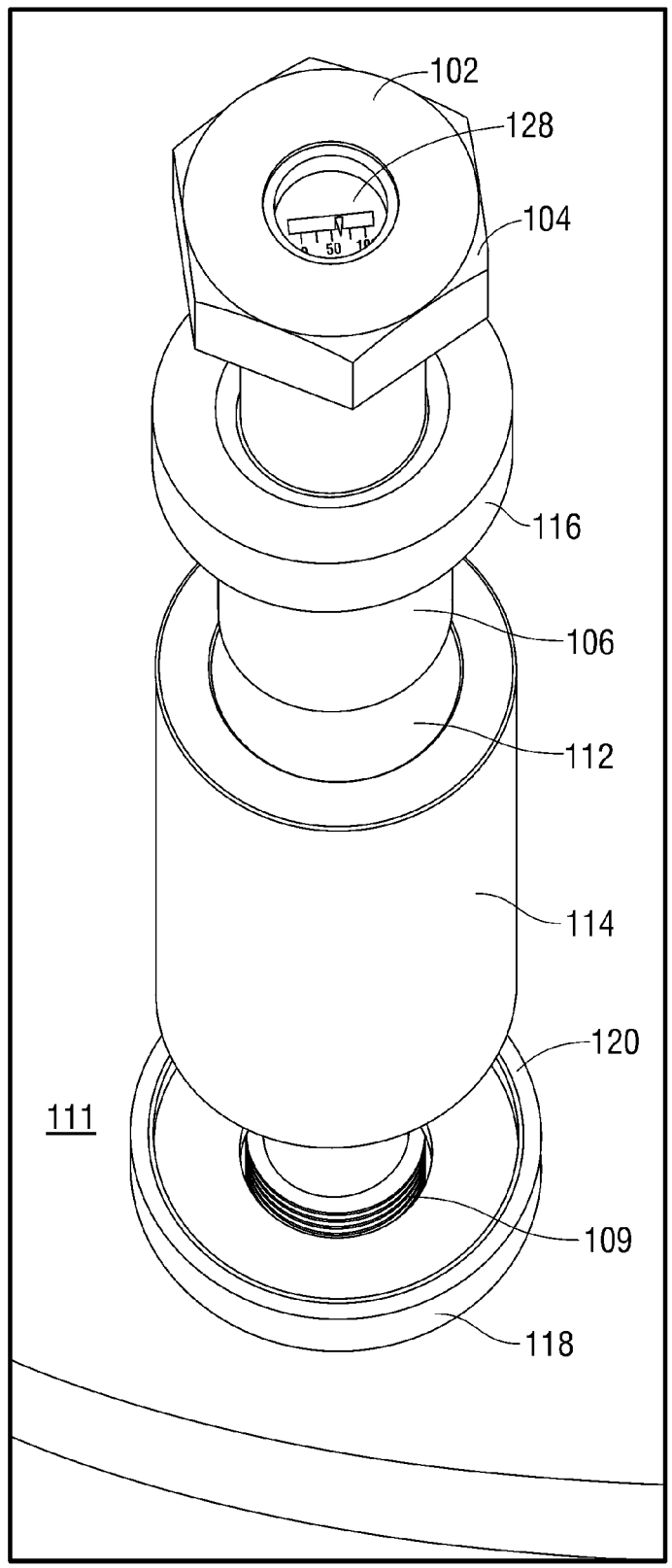
FIG. 4 is an exploded perspective view of another load indicating fastening system including an in-fastener indicator.

With reference to FIG. 4, system 101a includes a fastener 102a having an in-bore indicator 128 positioned within central bore 108 formed in fastener head 104 and gauge length 106. In-bore indicator 128 can include one or more levers as previously described In some implementations, an optional reaction ring interlocks with a hole in the compression sleeve and provides a reaction point during tightening or loosening of fastener 102. The reaction ring can be slipped over the compression sleeve and a spring loaded pin snaps into the hole in the sleeve to prevent the sleeve from turning. The reaction ring defines slots for receiving a reaction bar. The hole is formed near the top of the sleeve to prevent twisting of the sleeve.

In some implementations, a load indicator includes a housing or "cartridge" housing connecting various indicator elements. The housing or cartridge may be temporarily mounted to the head of a fastener or may be permanently mounted within a fastener bore to measure the tensile load of the fastener. The cartridge includes moveable members, e.g., levers or dials, that interact to provide an amplified response to the elongation of the fastener to provide a visual indication along a visual scale.

Figure 5:
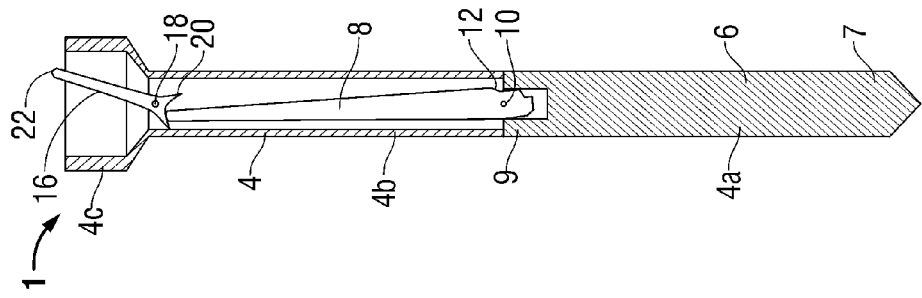
FIG. 5 is a schematic diagram of a central bore of a fastener housing a single-lever in-fastener load indicating assembly.

With reference to FIG. 5, a schematic diagram shows a cut-away view of an in-fastener single lever load indicator 1 within an elongated internal bore 4 of a fastener, including bore sections 4a, 4b, and 4c extending from the head of the fastener to a lower internal point. Bore section 4a extends into the gauge length of the fastener and is configured to receive a reference datum rod 6 configured to act upon a single elongated lever 8 disposed in bore section 4b. Lever 8 is moveable within bore 4 about a pivot 10 in response to movement of datum rod 6 during elongation of the fastener. The dashed lines indicate the resting position 5 of lever 8 prior to elongation of the fastener and the corresponding solid lines indicate the elongation position 7 of lever 8. As a first end 12 of lever 8 moves in contact with datum rod 6 a second end 14 of lever 8 produces an amplified response, moving second end 14 between position 5 and position 7. Section 4c is configured to accommodate the amplified range of movement of second end 14. Thus, a smaller, less visible movement of datum rod 6 within bore 4 is converted into a larger, more visible movement at second end 14 of lever 8.

With the single lever configuration shown in FIG. 5, the depth and diameter of bore section 4c is determined by the desired amplified range of movement of second end 14 and the length of lever 8. For example, for the range of movement of second end 14 to travel a full half inch visual scale, the diameter of section 4c must be substantially equal to one half inch. The depth of section 4c, in turn, must be sufficient to provide clearance for movement of the remaining length of lever 8. Single lever indicators have proven very reliable and effective but have typically been limited to use in fasteners having larger shanks or thicker heads due to the required depth of bore section 4c. Thus, use of multiple levers provides for a significantly shallower bore section 4c to enable use of load indicator 1 in fasteners having smaller diameter shanks and smaller heads.

Figure 6:
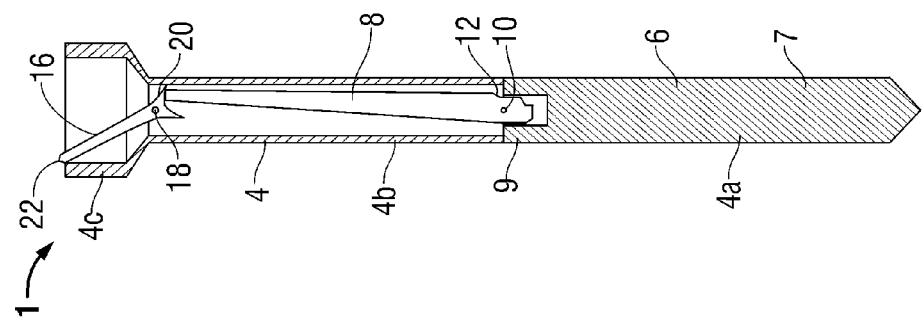
FIG. 6 is a schematic diagram of a central bore of a fastener housing a dual-lever in-fastener load indicating assembly, under an applied load.

With reference to FIG. 6, a cut-away view is shown of a load indicator 1 having a first lever 8 within bore section 4b and a second lever 16 disposed within bore section 4c. First end 12 of lever 8 engages datum rod 6 disposed in bore section 4a causing lever 8 to respond to movement of datum rod 6 during elongation of the fastener. Datum rod 6 may be integral to the fastener or may be a separate component inserted into bore section 4.

A datum rod 6 comprises a post 7 configured to extend a predetermined distance into section 4a in the shank of the fastener. Different lengths of post 7 may be used to enable use of a standard size of load indicator 1 with various lengths of fasteners having various lengths of bore 4. Datum rod 6 further includes an annular rim 9 about the top of post 7. Pivot 10 and any portion of lever 8 may extend into the opening in the center of annular rim 9. Annular rim 9 serves to contact first end 12 of lever 8 independent of the orientation of load indicator 1 within bore 4. It is understood that datum rod 6 may include any other suitable feature for engaging lever 8 and may be configured for a particular orientation of load indicator 1 within bore 4. Datum rod 6 may anchored at its lower end in section 4a and substantially free along the length of post 7 to convey elongation of bore 4 to load indicator 1.

With continued reference to FIG. 6, a second lever 16 is disposed within bore 4 and is moveable about second pivot 18. A first end 20 of second lever 16 is responsive to movement of second end 14 of lever 8 causing corresponding movement of a second end 22 of second lever 16. First end 20 may be configured to engage lever 8 in both directions. Alternatively, second lever 16 may be biased in one direction and moveable in a second direction in response to movement of lever 8.

Second lever 16 may be sized and configured to provide any desired degree of response to movement of lever 1. For example, second pivot 18 may be positioned at the midpoint of second lever 16 or may be shifted towards one end to further amplify the response of second lever 16. For example, both levers 8 and 16 may produce amplified responses, with the sum response being significantly greater than that provided by a single lever of comparable length. Second lever 16 is depicted with second pivot 18 positioned adjacent first end 20 of second lever 16 to provide an amplified response at second end 22 of second lever 16. Bore section 4c is sized to accommodate the amplified response movement of second lever 16.

Comparison of FIGS. 5 and 6 demonstrates on advantage provided by use of multiple levers with in-fastener mounting regarding the depth of bore section 4c. By limiting the range of movement of lever 8 to the smaller diameter of bore section 4b and shifting the broader amplified response to second lever 16, the degree of clearance required for lever 8 is significantly reduced and the depth of section 4c is likewise significantly reduced. Additional advantages afforded by aspects of the present invention include increased sensitivity of load indicator 1, a reduction in the overall length of load indicator 1 and in the depth of bore 4. Further advantages included increased manufacturing efficiency, less loss of fastener material to bore 4, and compatibility with smaller or more conventional fasteners. A multi-lever configuration provides similar advantages in separable indicators. For example, the indicator housing or cartridge may be made more compact for use in tighter areas or with smaller fasteners while allowing for use of wrenches or other tools to tighten the fastener.

Figure 7:
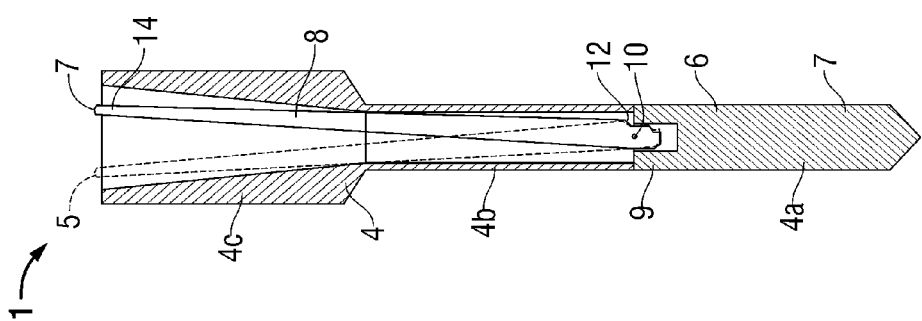
FIG. 7 is a schematic diagram of the central fastener bore and load indicating assembly of FIG. 6 without a load.

With reference to FIG. 7, a schematic diagram of a cut-away view of the load indicator of FIG. 6 is shown with levers 8 and 16 in a second position corresponding to maximum elongation of the fastener as well as to the default position of levers 8 and 16 prior to insertion into bore 4. During installation and calibration of load indicator 1 in bore 4 of a fastener, datum rod 6 is first installed in bore section 4a and load indicator 1 is then press-fitted or threaded into bore 4 or is otherwise secured to the fastener. Additional methods of attaching load indicator 1 to a fastener are described with reference to FIGS. 5-6.

Load indicator 1 is advanced within bore 4 until first end 12 of lever 8 contacts datum rod 6. Load indicator 1 is further advanced until the second end 22 of second lever 16 indicates zero load on a visual scale associated with second lever 16. It is understood that any number of load indicator components may be suitably independently or jointly installed and adjusted to achieve calibration of load indicator 1. As datum rod 6 moves due to elongation of the fastener, second end 22 of second lever 16 travels along the visual scale to indicate the corresponding elongation or loading conditions.

In an alternative implementation, load indicator 1 may include or be attached to an electronic circuit or other mechanism for initiating auto shut-off of a pneumatic tightening tool or other powered tool to prevent over-tightening. Load indicator 1 can also be attached electronically to a remote reader for automated monitoring of the clamp load status of a large number of fasteners 2.

Figure 8A:
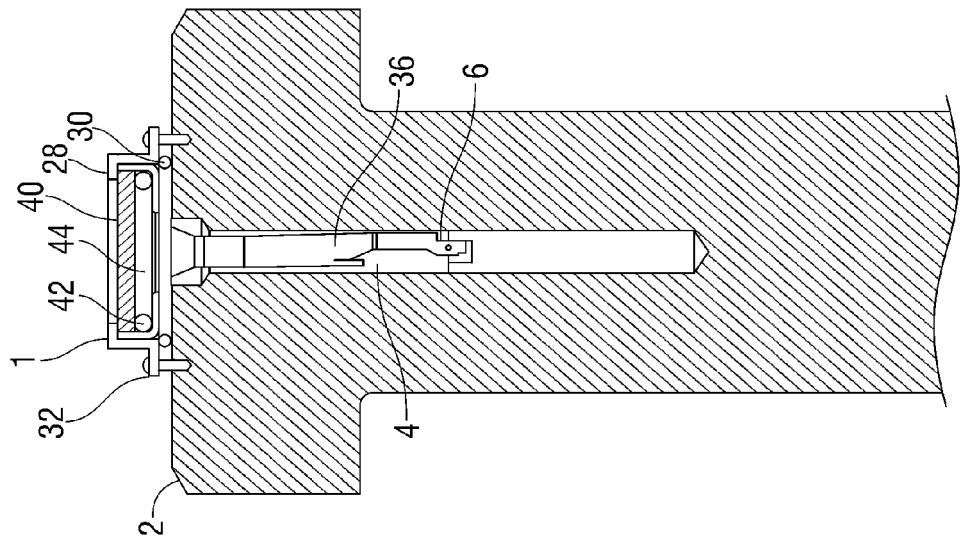
FIGS. 8A-8B are schematic diagrams of a cartridge for retaining the levers of an in-fastener load indicating assembly.
Figure 8B:
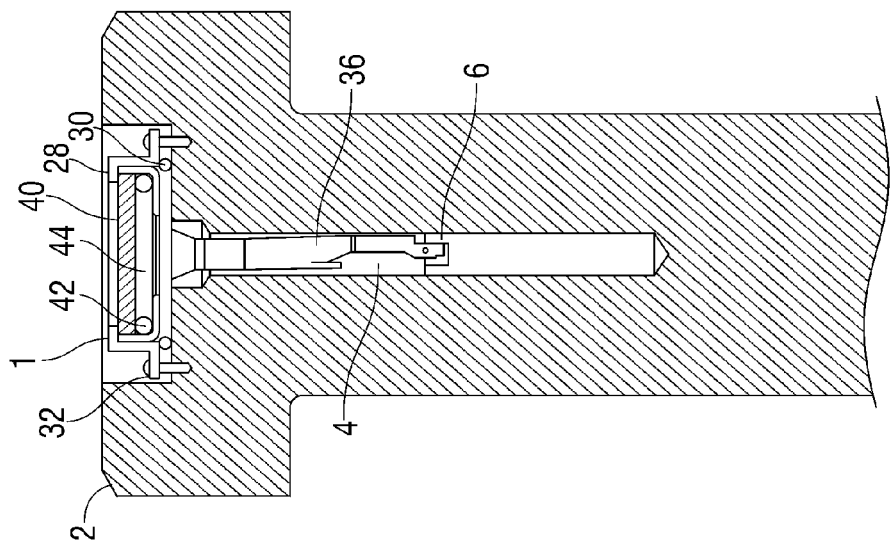

With reference now to FIGS. 8A-8B, a schematic diagram of a cut-away view of a load indicator installed within fastener 2. In one implementation, load indicator 1 includes cartridge 36 configured for insertion into bore 4. Cartridge 36 retains pivots 10 and 18 securing levers 8 and 16 within bore 4. Cartridge 36 may further retain a spring for biasing one of levers 8 or 16 in a default position. Association of levers 8 and 16 and pivots 10 and 18 with cartridge 36 facilitates easy installation and removal of load indicator 1 from bore 4. Cartridge 36 is connected at its upper end to bezel 28. Cartridge 36 can be recessed within the fastener head or may be mounted on top of the fastener.

Figure 9:
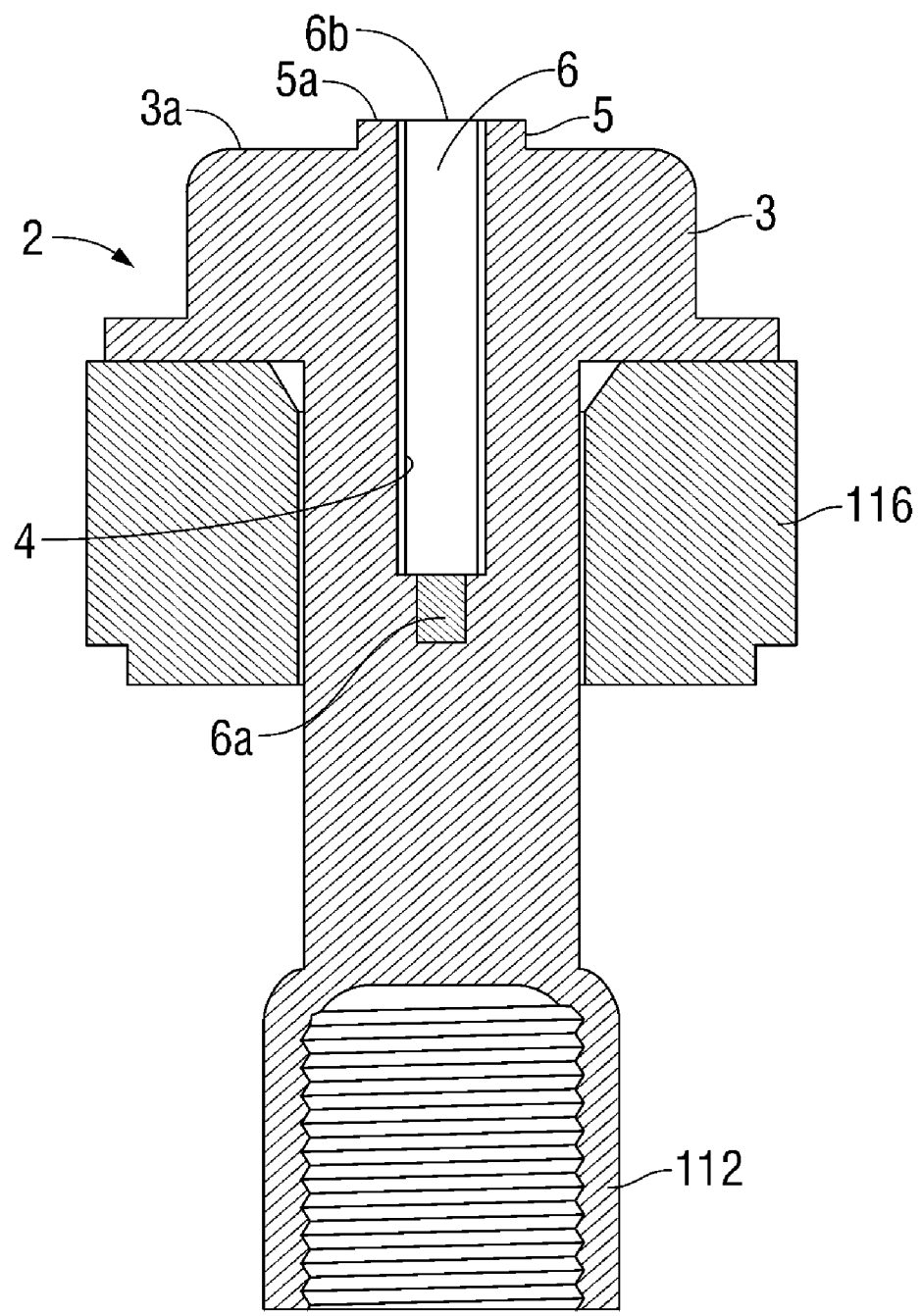
FIG. 9 is a cross-sectional view of an internally threaded fastener and split washer showing the datum rod anchored within the central bore and a coupler for a removable indicator.
Figure 11:
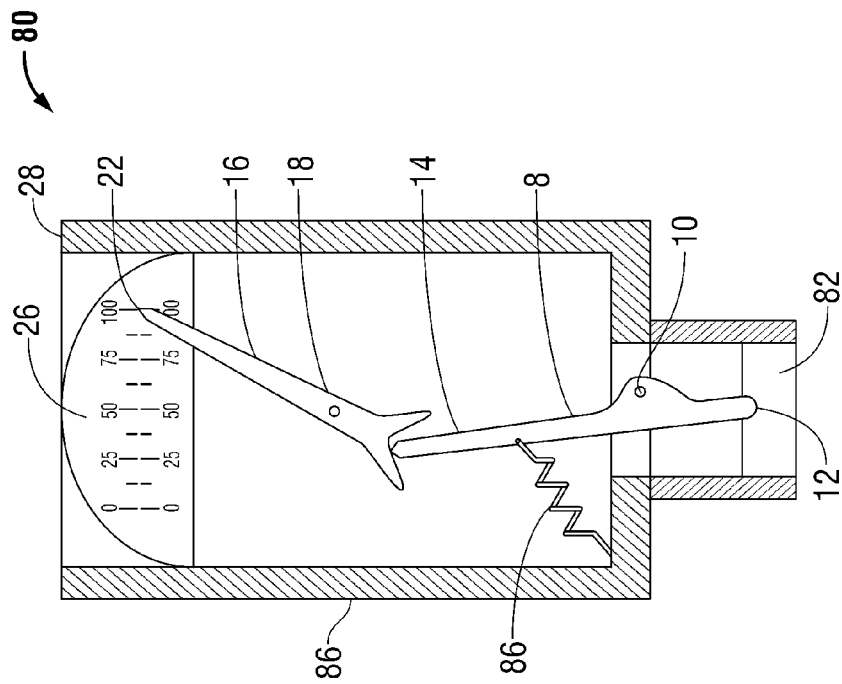
FIG. 11 is a cross-sectional view of the load indicator of FIG. 10.
Figure 10:
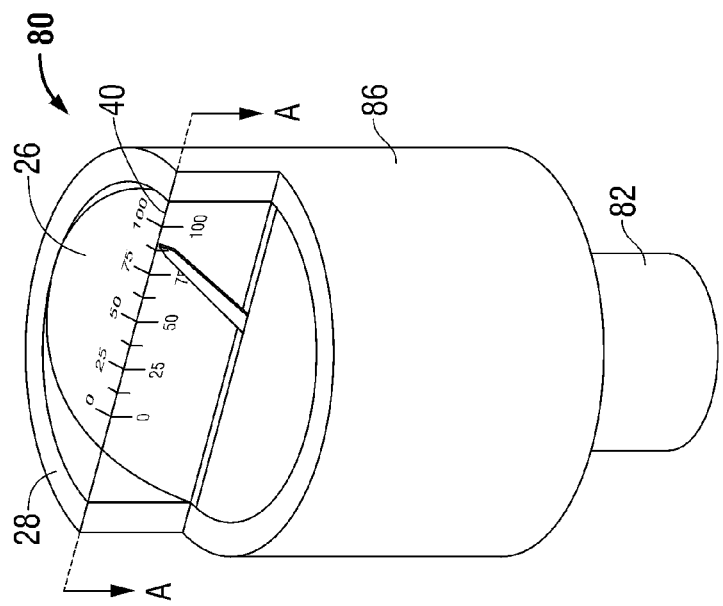
FIG. 10 is a perspective view of a removable load indicator for use with the fastener of FIG. 9.
Figure 12:
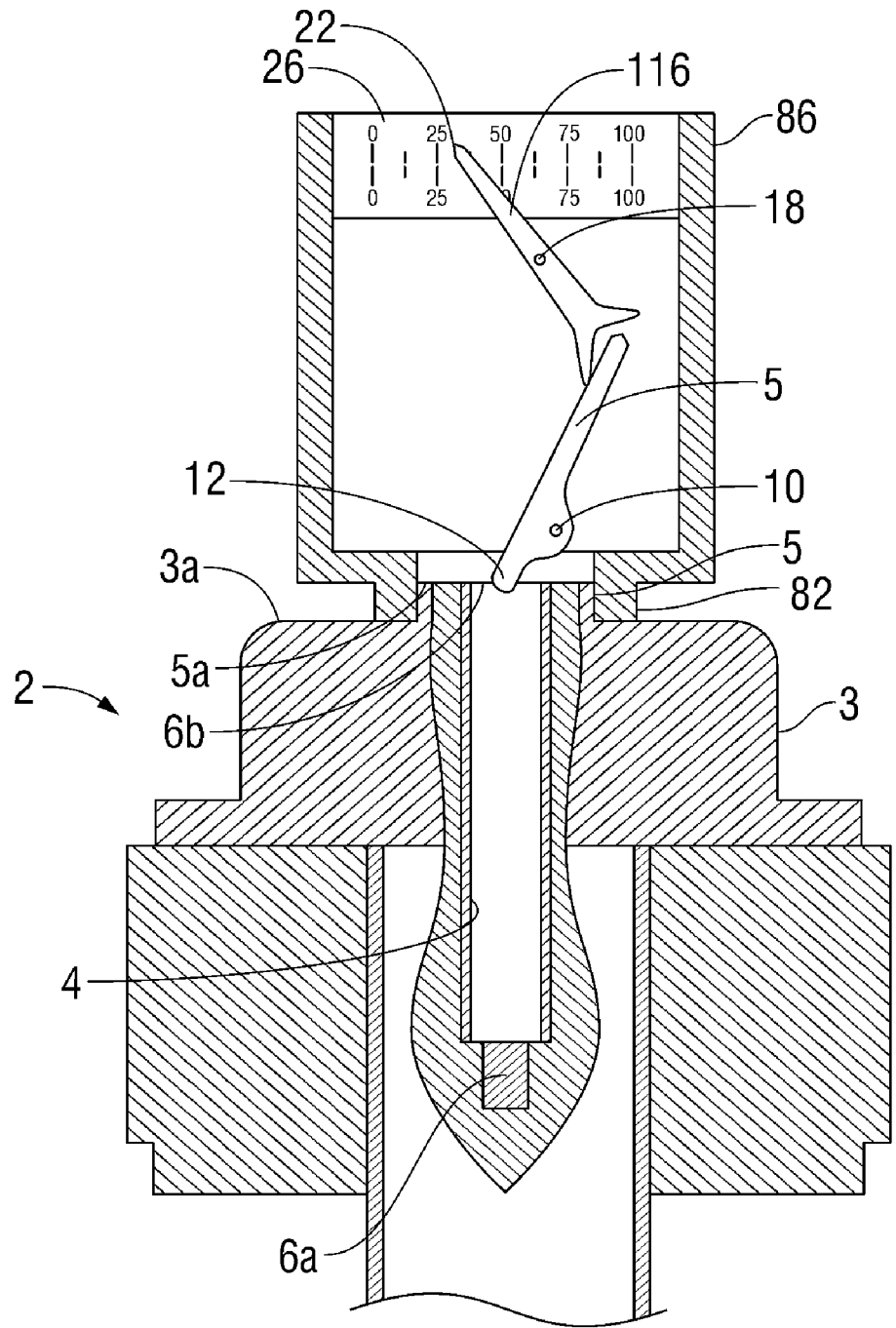
FIG. 12 is a side view of the load indicator of FIG. 10 coupled to the fastener of FIG. 7.

With reference now to FIG. 9, a fastener 2 is configured for use with a separable tensile load indicator shown in FIGS. 10-12. Fastener 2 defines a central bore 4 extending from the head 3 of fastener 2 into the gauge length of the fastener. Datum rod 6 is anchored at a lower end 6a within bore 4. Head 3 of fastener 2 further defines a load indicator interface 5 for use as a reference surface and/or for use in aligning and/or temporarily mounting or coupling a load indicator on fastener 2. Top reference surface 5a of load indicator interface 5 and top reference surface 6b of datum rod 6 are coplanar when fastener 2 is in a non-loaded state. As fastener 2 is tightened, bore 4 is elongated drawing datum rod top surface 6b downward away from top surface 5a of load indicator interface 5. In other implementations the datum rod and reference surface are not necessarily coplanar and another predetermined unloaded relative positioning of the free end of the datum rod and the reference surface can be used.

Figure 13:
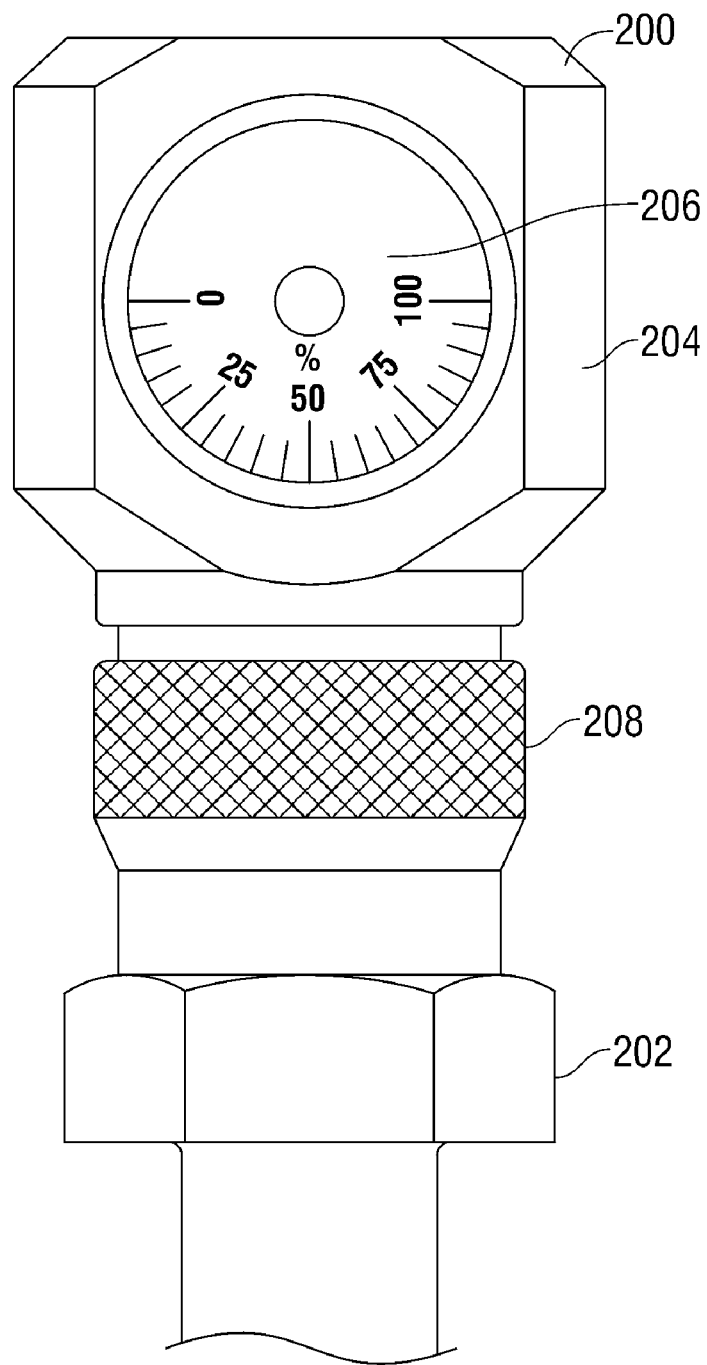
FIG. 13 is a cross-sectional view of the load indicator of FIG. 10.

With reference to FIG. 13, a load indicator 200 is shown coupled to a fastener 202. Load indicator 200 includes a gauge housing 204 and a displacement gauge 206 disposed within housing 204. Gauge housing 204 includes a female coupler 208 at one end for coupling to a complementary male coupler formed on the head of fastener 202.

Figure 14:
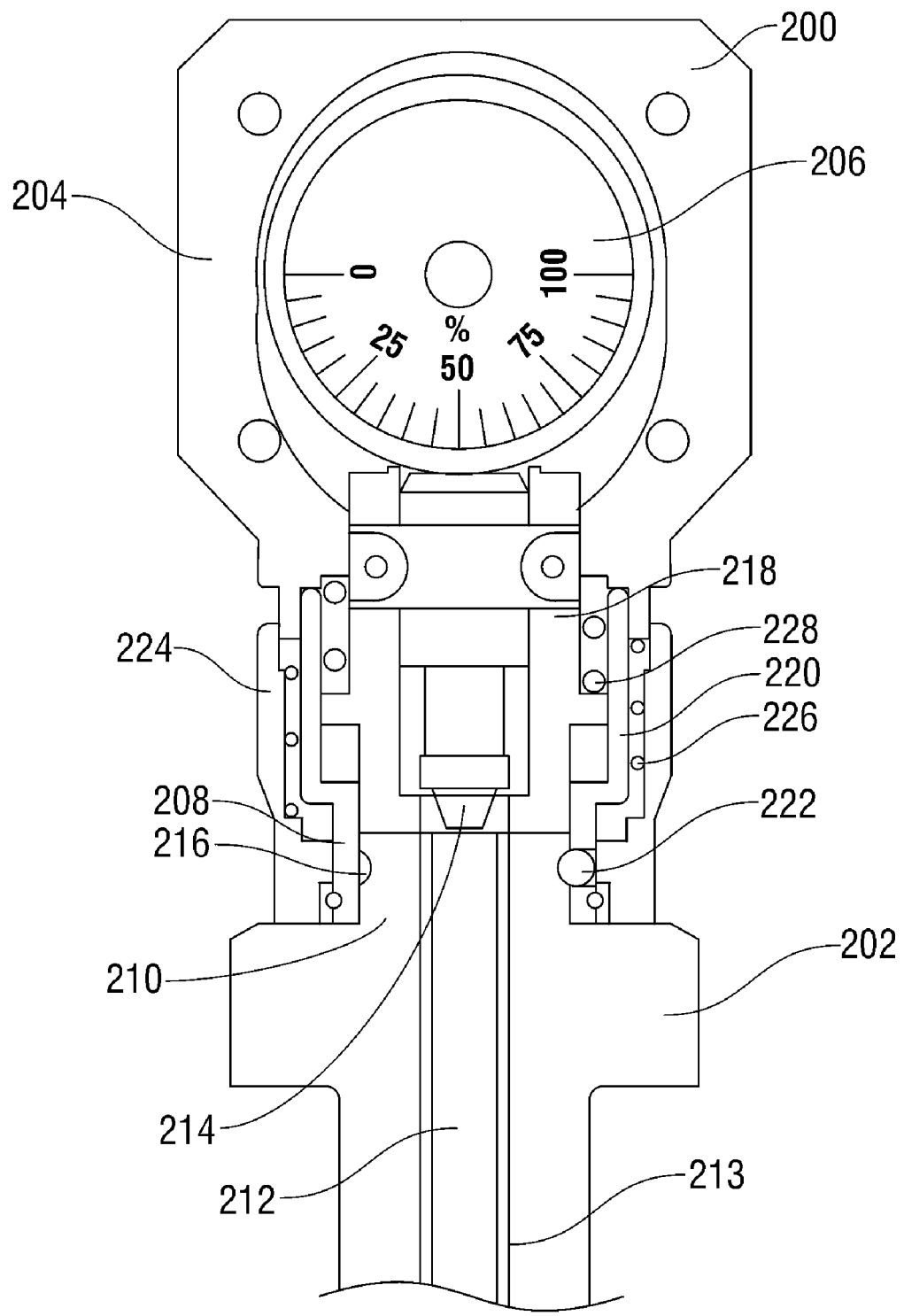
FIG. 14 is a side view of the load indicator of FIG. 10 coupled to the fastener of FIG. 7.

With reference to FIG. 14, load indicator 200 is indexed and removably coupled to fastener 202 via a male coupler 210 defined on fastener 202. Displacement gauge 206 is disposed within housing 204 and includes a probe 214 disposed within female coupler 208. A plurality of indexing projections 222 are spaced about an interior of female coupler 208 and are moveable to engage male coupler 210 to index probe 214 relative to fastener 202.

A datum rod 212 is anchored at a first end within a central bore 213 defined in fastener 202 such that elongation of fastener 202 causes displacement of a second free end of datum rod 212 relative to male coupler 210. Displacement of datum rod 212 is measured by probe 214 to provide an indication of fastener loading.

Female coupler 208 includes a piston 218 bearing probe 214. Piston 218 is biased towards an unlocked or decoupled position via spring 228. Spring 228 may be a coil spring concentric to piston 218 and acting between housing 204 and a flange or other feature formed on piston 218.

A sleeve 220 is positioned concentric to piston 218 and bears a plurality of indexing projections 222. Indexing projections are shown as ball bearings retained in a journal formed radially through sleeve 220. A locking ring 224 is positioned concentric to sleeve 220 and is biased by coil spring 226 towards a locked position in which locking ring 224 maintains indexing projections 222 in engagement with indexing contour 216 on male coupler 210. Piston 218 is retractable within sleeve 220 via insertion of male coupler 210. Indexing projections 222 are inwardly extendable in response to movement of locking ring 224 into the locked position to thereby engage indexing contour 216 on male coupler 210 and securely index probe 214 relative to fastener 202.

Spring loading of piston 218 and locking ring 224 provide for snap-fit indexing and coupling of loading indicator 200 to fastener 202 by sliding female coupler 208 over male coupler 210. For example, female coupler 208 is pressed onto male coupler 210 until an end face of piston 218, which forms a seat portion of female coupler 208, contacts and end face of male coupler 210. Continued movement of female coupler 208 over male coupler 210 compresses spring 228 as male coupler 210 displaces piston 218 within sleeve 220. As the indexing contour 216 on male coupler 210 aligns with indexing projections 222, indexing projections 222 are urged into engagement with indexing contour 216 by spring loaded locking ring 224.

Indexing projections 222 are shown as ball locks, e.g., ball bearings formed of stainless steel. In alternative implementations, indexing projections may include non-spherical elements such as spring tabs depending from sleeve 220 or other feature suitable to engage an indexing contour 216 formed on male coupler 210.

Indexing contour 216 is shown as a circumferential groove or annular recess defined on a lateral surface of male coupler 210. Indexing contour 216 allows indexing projections 222 to engage male coupler 210 at any rotational orientation of load indicator 200 atop fastener 202. The semi-circular profile of and circumferential continuity of indexing contour 216 provides a self-centering alignment aspect of indexing of load indicator 200 atop fastener 202.

"Indexing" as used herein refers to precise positioning of probe 214 relative to a fixed reference on fastener 202, e.g., an end face of male coupler 210. This precise positioning can include both axial and radial alignment and positioning components. For example, probe 212 can be indexed to fastener 202 via indexing projections 222 to both position the probe 212 axially proximate or in abutment with datum rod 212 and radially centered over datum rod 212. Accordingly, indexing contour 216 on male coupler 210 and indexing projections 222 on load indicator 200 cooperate to index probe 214 relative to a fixed reference surface of fastener 202, such as an end face of male coupler 210. Displacement of a free end of datum rod 212 relative to the end face of male coupler 210 or other fixed reference surface can provide an indication of fastener elongation and thereby loading in fastener 202.

In some implementations, the end face of male coupler 210 or other fixed reference surface can be used in combination with indexing projections 222 in and indexing contour 216 to securely index probe 214. Thus, in some cases, indexing projections 222 may be the primary or even sole means of indexing probe 214, while in some cases, additional coupler features may additionally contribute to indexing of probe 214.

In some implementations, displacement gauge 206 is moveable within housing 204 with movement of piston 218. Movement of probe 214 relative to piston 218 and the connected displacement gauge 206 provides an indication of displacement of datum rod 212 and elongation of fastener 202. In some cases, probe 214 includes at its tip a ball bearing to provide a point contact with the free end of datum rod 212. The ball bearing is axially movable within an axial journal to act upon a push rod causing a dial of a dial gauge to traverse a dial gauge scale visible through an opening defined in housing 204. It will be appreciated that a common dial gauge or any other suitable mechanical, electro-mechanical, or electrical gauge or probe may be used in conjunction with the described indexing features to obtain a suitably precise measurement of elongation and lending.

Housing 204, piston 218, sleeve 220 and locking ring 224 may be machined, molded or otherwise formed of aluminum, steel, brass, or other suitably durable and rigid material, e.g., plastic or composite material. Locking ring 224 can include a taper, knurling, or other feature to facilitate retraction of locking ring 224 to decouple load indicator 200 from fastener 202. Retraction of locking ring 224 moves a locking portion of locking ring 224 out of locking engagement with indexing projections 222. Upon retraction of locking ring 224, indexing projections may be retracted from engagement with indexing contour 216 of male coupler 210 and load indicator 200 may be decoupled from fastener 202.

A number of implementations of the invention have been described. Nevertheless, it will be understood that various modifications may be made without departing from the spirit and scope of the invention. For example, internally threaded portion 12 can be configured as a female coupling for receiving stud 9 and a male threaded extension of gauge length 6. Accordingly, other implementations are within the scope of the following claims.

What is claimed is:

1. A load indicating fastening system for use in a fastening, the system comprising:
   a fastener comprising:
      a fastener head;
      a fastener gauge length below the head and defining, together with the head a central fastener bore;
      a datum rod having a longitudinal length with a first end anchored at a first portion of the central bore and a substantially free datum end extending toward the fastener head and moveable longitudinally relative to the fastener head during elongation of the fastener gauge length; and
      an internally threaded fastener portion below the central fastener bore and configured to thread over external threads of a complementary stud; and
   a compression sleeve sized to receive the internally threaded fastener portion and the fastener gauge length and configured to bear a compressive force of the fastening.

2. The system of claim 1, wherein the compression sleeve is constructed with sufficient column strength to be a substantially incompressible under normal fastening loading.

3. The system of claim 1, further comprising a split washer between the fastener head and the compression sleeve.

4. The system of claim 3, wherein the split washer includes a shoulder configured to fit within the compression sleeve to substantially align the gauge length longitudinally within the compression sleeve.

5. The system of claim 1, further comprising a make coupling, feature defined on the fastener head for removably coupling a load indicator thereto.

6. The system of claim 5, further comprising the load indicator, wherein the load indicator comprises a plurality of indexing projections spaced about an interior of as female coupler portion of the load indicator, the indexing projections being moveable to engage the male coupler of the fastener head to thereby index the load indicator relative to the male coupler of the fastener head for measurement of displacement of the free end of the datum rod.

7. The system of claim 1, further comprising, a lever pivotally fixed within the central bore and responsive to displacement of the datum rod within the central bore.

8. The system of claim 1, farther comprising a second lever pivotally fixed within the central bore and responsive to the first lever.

9. The system of claim 1, further comprising a base washer between the compression sleeve and a joint surface.

10. The system of claim 1, further comprising a semi-spherical base washer and a complementary seat on the compression sleeve to allow for variable angular alignment of the compression sleeve on the spherical washer.

11. The system of claim 1, wherein the fastener head defines a datum reference surface configured such that displacement of the free datum rod end is measurable relative to the reference surface to determine loading.

12. The system of claim 11, further comprising a free datum rod end displacement reader.

13. The system of claim 1, further comprising a base washer including a rim configured to align the compression sleeve with the base washer about the stud.

14. The system of claim 1, wherein the fastener gauge length is of a lesser outer diameter than the outer diameter of the internally threaded fastener portion.

15. The system of claim 1, wherein the compression sleeve further comprises a counter-torque reaction feature for use during tightening of the fastener.

* * * * *